Aug. 30, 1955     F. W. ANDERSON     2,716,549
PIN SETTING MACHINE Filed Dec. 16, 1949     8 Sheets-Sheet 1

Inventor:
Frank W. Anderson,
by Emery, Booth, Townsend, Miller & Weidner
Att'ys

Aug. 30, 1955  F. W. ANDERSON  2,716,549
PIN SETTING MACHINE
Filed Dec. 16, 1949  8 Sheets-Sheet 2

Inventor:
Frank W. Anderson
by Emery, Booth, Townsend, Miller & Widrew
Attys

Aug. 30, 1955 F. W. ANDERSON 2,716,549
PIN SETTING MACHINE

Filed Dec. 16, 1949 8 Sheets-Sheet 3

Fig. 3.

Inventor:
Frank W. Anderson,
by Emery, Booth, Townsend, Miller & Widner Attys

Aug. 30, 1955   F. W. ANDERSON   2,716,549
PIN SETTING MACHINE
Filed Dec. 16, 1949   8 Sheets-Sheet 4

Aug. 30, 1955 F. W. ANDERSON 2,716,549
PIN SETTING MACHINE

Filed Dec. 16, 1949 8 Sheets-Sheet 6

Aug. 30, 1955   F. W. ANDERSON   2,716,549
PIN SETTING MACHINE
Filed Dec. 16, 1949   8 Sheets-Sheet 7

Inventor:
Frank W. Anderson,
by Emery, Booth, Townsend, Miller & Whitney
Attys

United States Patent Office 2,716,549
Patented Aug. 30, 1955

2,716,549

PIN SETTING MACHINE

Frank W. Anderson, North Weymouth, Mass., assignor to Murphy Automatic Pinsetter Co., Inc., Somerville, Mass., a corporation of Massachusetts Application December 16, 1949, Serial No. 133,386

5 Claims. (Cl. 273—43)

This invention relates to a pin handling machine for bowling alleys wherein pins as received in miscellaneous arrangement in the pit at the rear of the alley are delivered to a "setter" proper in which they are received in proper triangular array, and which deposits them on the alley surface to be bowled at. The subject matter claimed in the present application is the construction and arrangement of such setter. In practice this would form part of an organized machine including such a setter, and suitable alley clearing means. Certain parts of such latter mechanisms are disclosed in the drawings, but they will herein be referred to only in a very general way. I refer to my copending application, Serial No. 133,385, filed December 16, 1949, now Patent No. 2,668,713, for a fuller disclosure of the mechanisms so shown, the mechanisms of the two applications when combined in a coordinated machine being a preferred construction.

The object of the invention is to provide a compact combination of parts which will function rapidly, smoothly and accurately.

My invention will be well understood with reference to the following description taken in connection with the accompanying drawings wherein.

In describing the construction, particularly to permit the initial orienting description which will follow, I have designated by capital reference letters intended to correspond to the initials of descriptive words certain portions of the mechanism the division being somewhat arbitrary. Electric switches have been designated by the letter S and discriminated one from another by the numeral following that letter. The letter M designates a motor and the letters SM a solenoid motor, again with a discriminating numeral following. The letter w with a following numeral is an electric wire. Numerals 1–10 indicate the respective pins so-called, that is the No. 1 pin is the one at the apex of the triangular row as we look at it from the bowler's position, and the No. 7 pin, the pin at the left-hand extremity of the base. I designate as a prefix to a reference letter or numeral a part which receives a pin which will occupy the position so identified when it is transferred to the alley. No reference numeral has been used on the balls or pins as such, as they will be readily recognized. In the detailed description I have utilized odd numerals beginning with 15 to apply to those mechanisms more particularly the subject matter of the present application. In my companion application I have utilized for the parts there more particularly described, and shown only in a general way here, even numbers beginning with 20. The major reference letters applying to groups of parts are the same in the two cases.

An automatic machine for handling bowling pins and balls suitable for use with candle pins may include, as the one herein disclosed, the following parts:

1. Means for clearing the alley of standing pins and deadwood at the end of the frame, delivering them into the pit;
2. Mechanism in the pit for transferring the balls and pins in succession, one by one, to
3. A suitable elevating conveyor or hoist from which the balls are discharged for return to the head of the alley and which delivers the pins to
4. An assembly rack on which ten pins may be assembled in a row and which herein cooperates with
5. A rack feeder which positions the pins on the rack;
6. Means for discharging the set of ten pins from the rack at the proper time;
7. Transfer chutes, desirably fixed in position, into which the pins are delivered from the assembly rack and which deliver them in proper triangular array;
8. A setter frame which receives the pins from the chutes, and
9. Means for operating the frame to position the pins on the alley to permit a new frame to be bowled.

In the case of candle pins no mechanism need be provided for clearing deadwood from the alley until the frame is completed. Also, since the pins are symmetrical, no mechanism is necessary to insure that they be assembled facing in one particular direction. The present application is more particularly concerned with items 7, 8 and 9 above.

Figure 1:
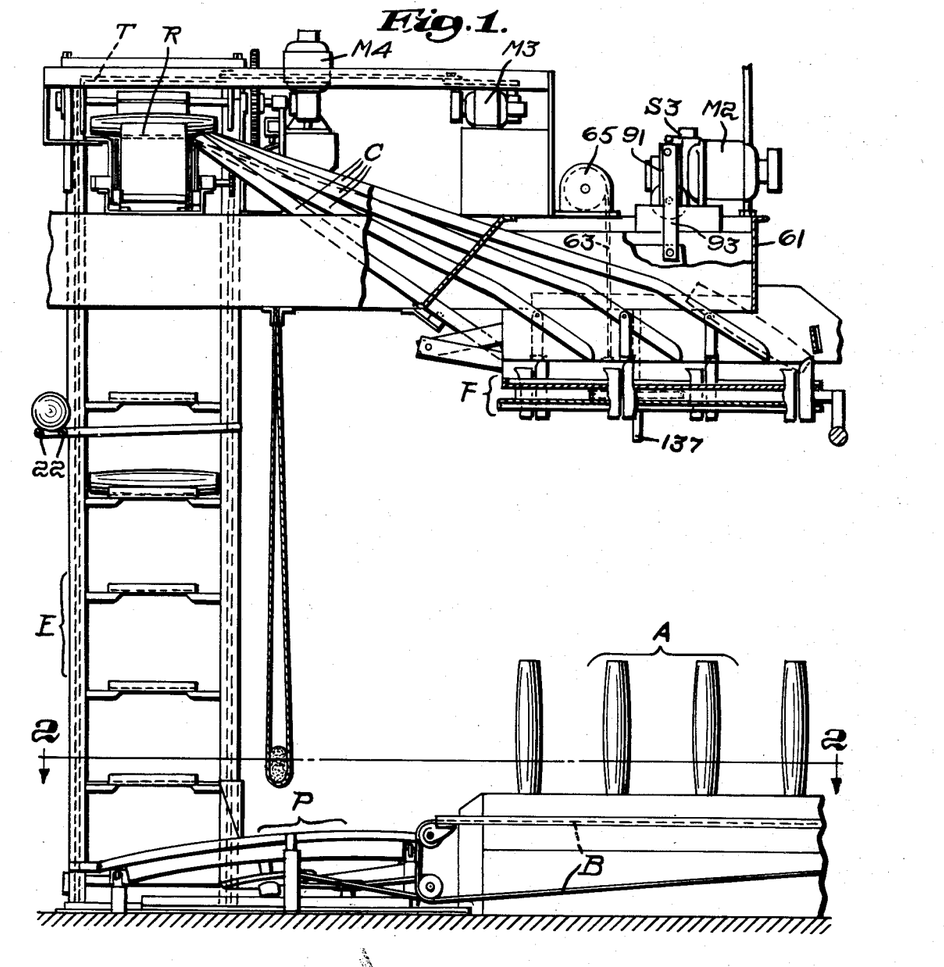
Fig. 1 is a side elevation of the machine with parts broken away.
Figure 2:
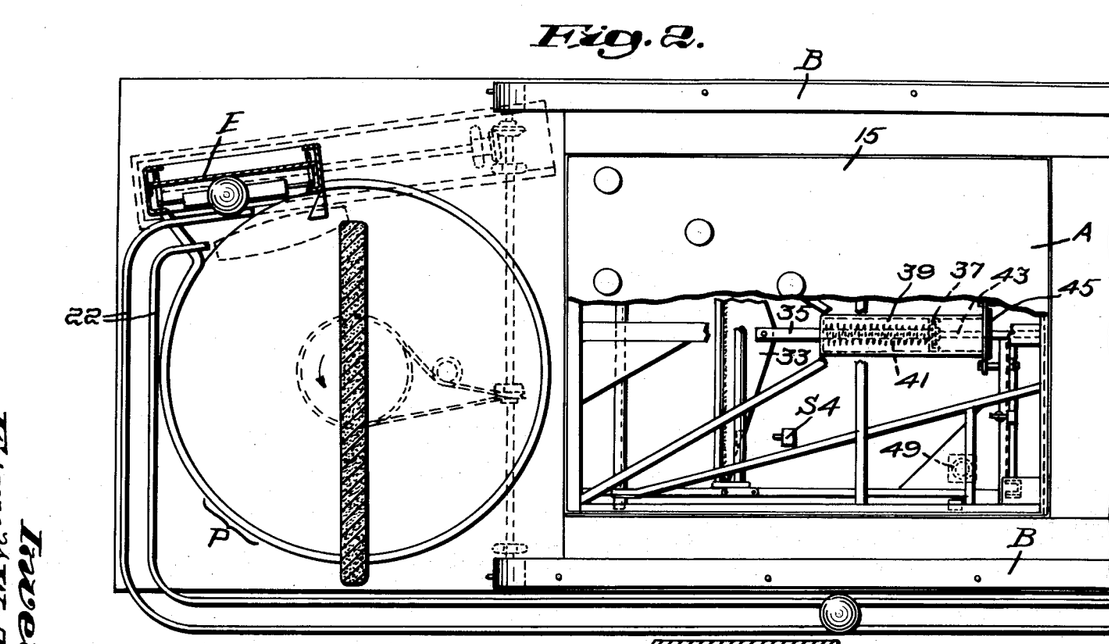
Fig. 2 is a figure showing in plan with parts broken away the rear portion of the alley and the pit.

Referring now more particularly to Figs. 1 and 2 of the drawings, a machine such as has just been referred to is therein shown, and I shall first describe it in a general way. In these figures we see the rear of the alley A and the pit P at the rear thereof into which pins and balls may be driven in the course of the game. Belts B in the gutters also deliver to the pit pins and balls which are driven off the alley surface at the sides. An elevator E at the rear of the pit has suitable flights for carrying pins and balls. At an intermediate portion of its height (see Fig. 1) the balls are nudged off the elevator onto the rails 22 along which they return by gravity to the head of the alley. The pins are carried past this member and delivered to the assembly rack R, seen at the upper left-hand portion of Fig. 1. After ten pins have been assembled in side by side relation on this rack, a transfer mechanism T pushes them off the rack into a set of fixed chutes C, through which they descend to a vertically reciprocating setter frame F, to which they are transferred when this frame moves downwardly toward the alley. The frame carries the pins down to the alley and releases them when it reaches its lowermost position, to be set up thereon in the manner shown in Fig. 1.

Figure 3:
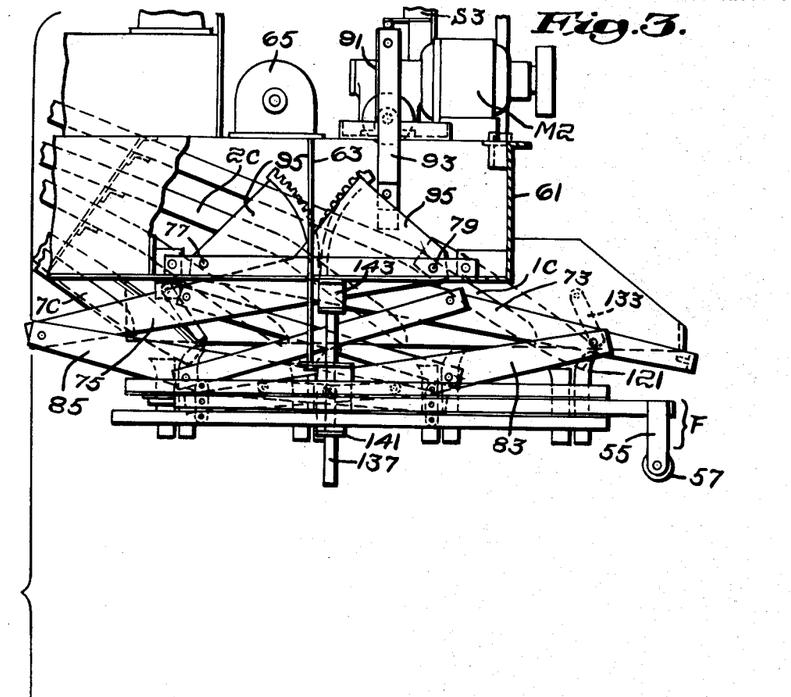
Fig. 3 is a part side elevation part longitudinal vertical section at the rear end of the alley. The upper and lower portions of the figure are shown nearer together than the scale of the parts would require in order to fit the sheet.
Figure 3A:
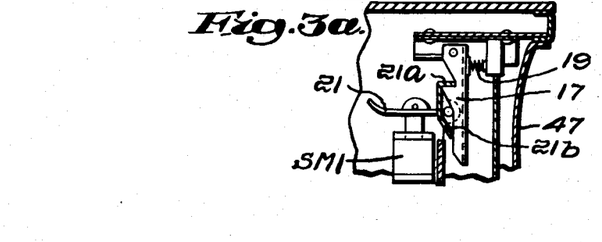
Fig. 3a is a fragmentary vertical section showing on an enlarged scale parts seen at the lower right-hand portion of Fig. 3.

Commencing now a more detailed description and referring now to Fig. 3 of the drawings, this represents the parts in the position which they have during the bowling of a frame. A set of pins is resting on the alley and another set of pins is in the chutes C and ready to move into the frame F when it starts to move downwardly. There may be other pins in the pit or on the way from the pit in the elevator to the rack or in the rack, but for the moment they do not concern us. The pins which are in play rest on a movable section 15 of the alley floor hinged at its rear end, and normally held in the horizontal position shown by a pivoted latch 17, best shown in Fig. 3a, which is held by spring 19 in engagement with the overhanging flange 21a of a pivoted keeper-plate 21. When a frame is finished the latch is manually released by the operation of a push-button S1 (see Fig. 12) at the head of the alley which energizes the solenoid SM1 and the movement of the core of the latter rocks keeper 21 from the latch, the lower end 21b of the keeper engaging the latch to push it to the right viewing Fig. 3a away from the flange 21a. The floor section 15 automatically rises to the position shown at the bottom of Fig. 4 and any pins thereon roll off into the pit to be processed there and eventually to be returned to the chutes C.

The floor section 15 is herein shown as lifted by levers 23 mounted on a rock shaft 25 and having rollers 27, which cooperate with suitable tracks 29 along the side edges of the floor section. The rock shaft is turned by cranks 31 connected by a link 33 (which as seen in Fig. 2 has the form of a triangle of low altitude) to the piston rod 35 of a piston 37 (see Fig. 2) in cylinder 39, against which acts a spring 41. The spring is compressed when the alley floor 15 is down, but when the latter is unlatched stored energy is released and the levers 23 raise the floor section. As the piston moves toward the right viewing Fig. 2, it carries with it an extension 43 projecting through a bushing in the piston head 45 shown at the right and a portion of the rod extension is flattened off. Air pressure is built up in the cylinder as the floor section rises cushioning the action of the spring, and when the flattened place passes the bushing the pressure is somewhat relieved so that the movement of the section is not unduly checked. The action is similar to that of well-known screen door checks, but the action on the lifting movement of the floor section corresponds to that which takes place on the closing movement of the screen door.

Beneath the floor section 15 and hinged thereto near the rear thereof is a barrier member 47 having upright walls corresponding to the sides and front of the section 15. The section 15 overlies this barrier member to hold it depressed in the position of Fig. 3, but when the floor section rises to the position shown in Fig. 4 the barrier section is released to the action of supporting springs 49 which lift it to the position shown in Fig. 4, where the walls project upwardly beyond the level of the main portion of the alley surface, the barrier being checked in this position by the engagement of hook 51 with stop member 53, as best seen in the lower portion of Fig. 4. This barrier member prevents balls or pins which may lie on the alley surface or be trundled down the same from getting underneath the section 15.

Figure 4:
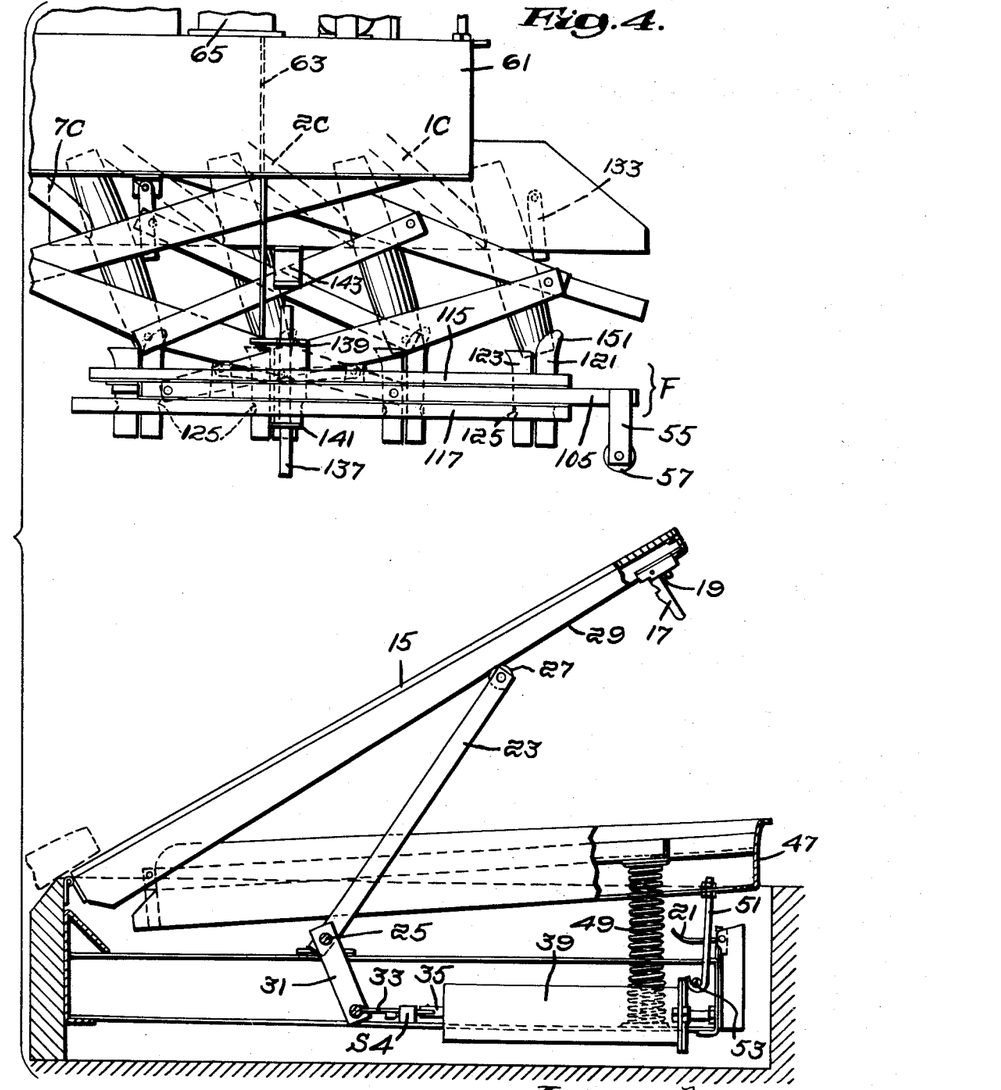
Fig. 4 is a view similar to Fig. 3 with the parts in a different position corresponding to a later stage of their cycle.

In the present embodiment of the invention, as soon as the section 15 beings its upward movement it closes a switch S4 which starts the downward motion of the setter frame F in a manner hereinafter more fully to be described. As seen in Figs. 2, 3 and 4 the actuator of the switch S4 may be in the path of movement of the link 33 connected to the piston rod 35, to be operated thereby. Fig. 4 at its upper portion shows the frame F at a time when it has started down and the pins in the chutes C are moving into the frame to be carried to the alley to provide a new setup. For the present we are concerned only with the function of the frame in restoring the floor section 15 to horizontal position.

Figure 5:
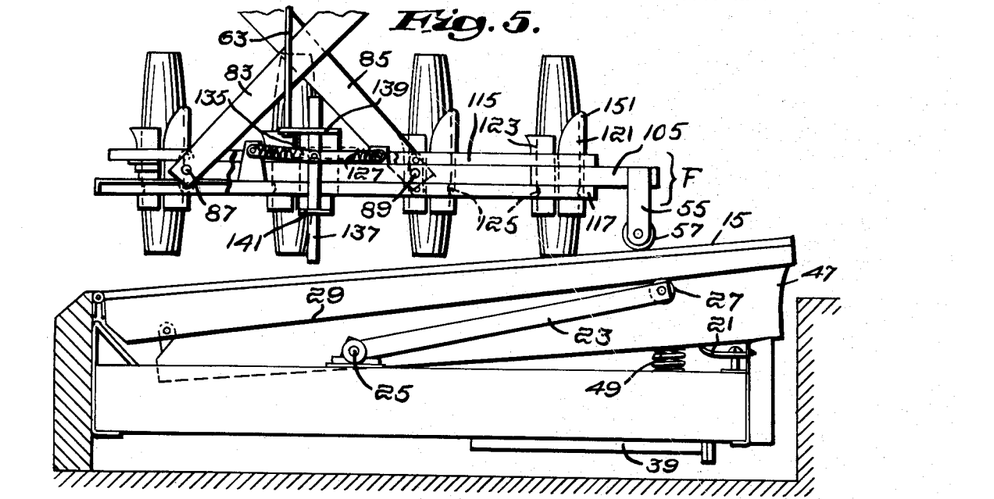
Figs. 5 and 6 are similar to Figs. 3 and 4 but show only the rear portion of the alley and lower portions of the setter frame and represent them in successively later positions of the parts in their cycle.
Figure 6:
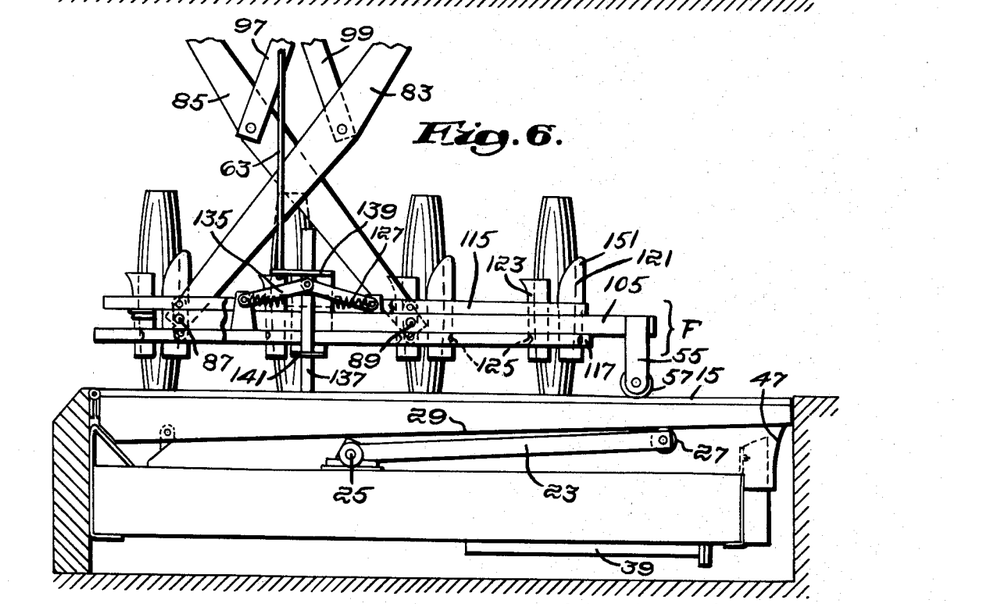

At the right-hand end of the frame viewing Figs. 3 and 4, opposite the forward end of the alley section, are depending arms 55 supporting a roller 57 and it will be apparent that when the frame moves from the position of Fig. 4 downwardly the roller will make contact with the raised alley section 15 and depress it through the position of Fig. 5, finally reaching the horizontal position shown in Fig. 6 in which the latch member 17 is automatically engaged with the keeper under the action of its spring.

There will next be described the mounting of the setter frame F and the means for giving it its motion toward and from the alley. The claims of the present application are directed to this construction. The setter frame is supported from an overhead member 61 cantilevered out over the end of the alley. There are no upright guides or other obstructions at the sides of the alley adjacent the rear thereof. The frame F is suspended from the overhead member at either side by collapsible and extensible linkages which are shown in the collapsed position in Fig. 3 and in the extended position in Fig. 7. The weight of the frame may be counterbalanced by long spiral springs 63 (similar to a watch spring) received in the housings 65 at the top of the support 61 and having their ends connected to the frame. Such a construction is preferred to counterweights as the latter would increase the inertia of the parts which have to be set in motion by the motor which reciprocates frame F. The effective weight of the frame with a load of pins therein plus the weight of floor section 15 is however greater than that of the floor section and the load of pins thereon which the floor section lifting mechanism was required to raise. Thus the frame in descending has ample force to compress the spring 41 of that mechanism, reenergizing it for its next operation.

Figure 7:
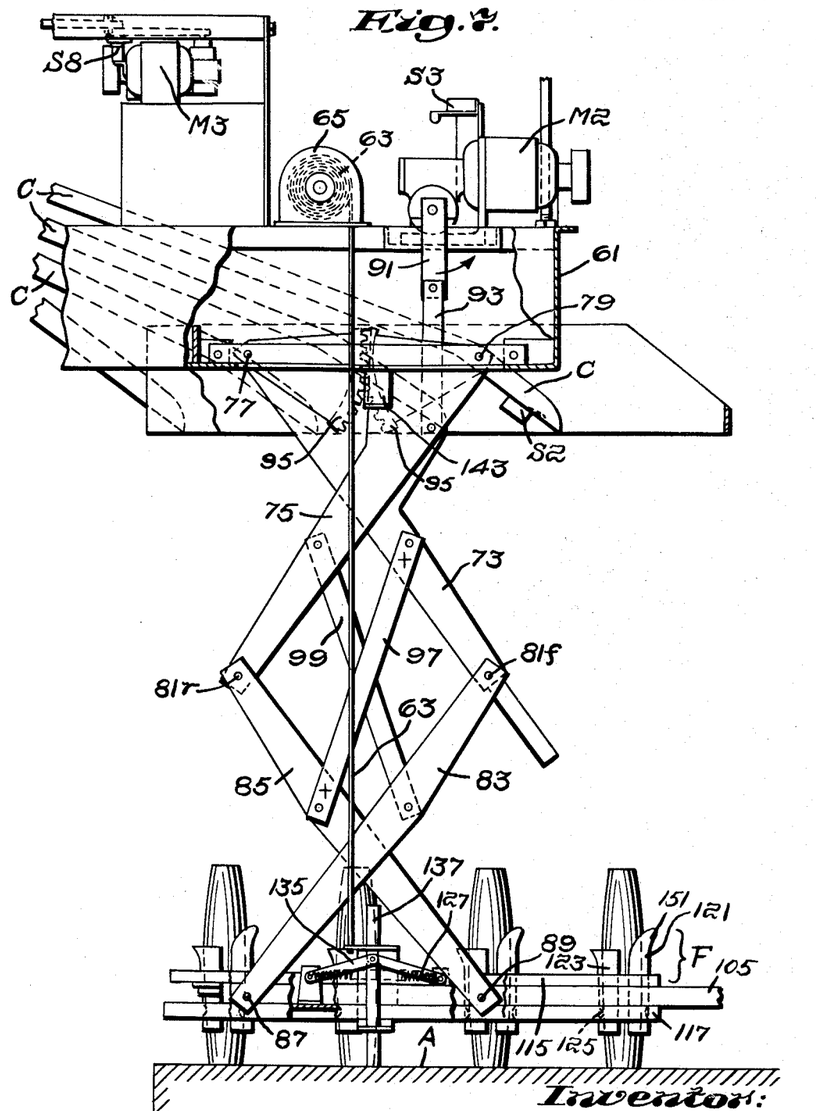
Fig. 7 is a side elevation with parts broken away. The time stage is the same as in Fig. 6.
Figure 8:
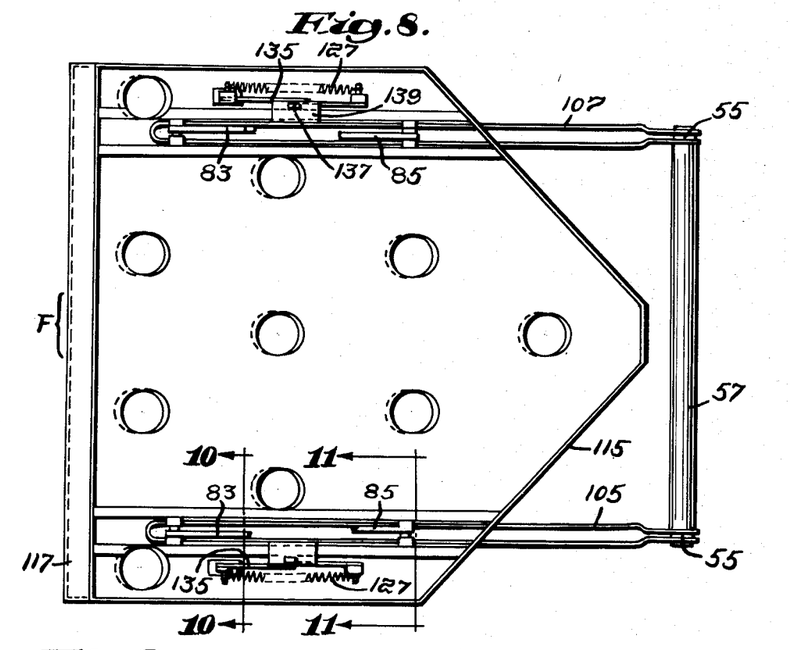
Figs. 8 and 9 show the setter frame in plan and in side elevation respectively.

Referring to Fig. 7, these linkages comprise a pair of arms 73 and 75 depending from fixed pivots 77 and 79 respectively on the support 61 and crossed. To their lower ends are pivoted on centers 81f and 81r respectively, the arms 83 and 85 which are crossed and pivoted at their lower ends to the setter frame at fixed pivots 87 and 89 respectively. The linkage superficially resembles a lazy tongs but is not, because there are no pivots at the crossings. The linkages are driven through one of the upper arms, herein the arm 75, from the electric motor M2 by a crank 91 and connecting rod 93 which connects to the arm 75 remote from its pivot 79. The extended position of the linkage, corresponding to the down position of the frame, and its collapsed position, corresponding to the raised position of the frame, occur substantially at the dead center positions of the crank. Thus the frame is hardly moving as it approaches the position of Fig. 6, and the pins are released therefrom gently and are deposited on the alley as if from a stationary member.

To insure movement of the frame F in a constantly maintained horizontal position means are provided for enforcing equal and opposite angular movements of the arms of the two crossed pairs. Herein sector gears 95, fixedly related to the arms and centered on the pivots 77 and 79 provide for such movement of the arms 73 and 75. While a similar gear connection might be provided between the centers 87 and 89, I prefer to utilize equalizing links 97 and 99, the former extending between the lower portion of the arm 73 below the cross and the upper portion of the arm 85 above the cross and the latter between the lower portion of arm 75 and the upper portion of arm 83, these two links being pivoted to the arms at points outwardly beyond the line between the centers of the pivots at the ends of the arms.

Viewing Fig. 7 it will be apparent that if the linkage is to collapse with the line of the centers 77 and 79 parallel to the line of the centers 87 and 89, the point marked X along the center line of arm 73 between the pivots 77 and 81f and a similar point marked X on arm 85 along the center line between pivots 81r and 89, the two points being equidistant from the centers 81f and 81r respectively, would move further apart in a horizontal direction as the arm 73 swings counter-clockwise and the arm 85 swings clockwise and nearer together in the vertical direction. The combined result of these components of movement is that these points would be further apart in a collapsed position such as shown in Fig. 3 than in the extended position of Fig. 7, as will be obvious if we consider the case of points 81f and 81r, which as seen in Fig. 3 have moved outwardly from the position of Fig. 7 a distance greater than the sum of their distances from point x. Therefore if our links 97 and 99 were connected at the points marked x the linkage would not function. However, the actual pivot points being set outwardly of the center line have a relative movement around these points and when they move through the lower left-hand quadrant viewing the upper end of link 97 and the upper right hand quadrant viewing its lower end the relative movements give the pivots a horizontal component of movement toward one another and a vertical component away from one another. In practice wtihin the necessary vertical range of movement and the corresponding angular range of movement of the arms of the linkage eequalization of movement is provided without tendency to bind and with tight joints at the several pivots. Specifically in the machine illustrated in the raised position of Fig. 3 the line of the pivots 87 and 89 is about 10½ inches below the line of the pivots 77 and 79 and in Fig. 7, 50½ inches, the setter frame moving through a stroke of 40 inches. In the actual construction illustrated the angles of the arms vary from about 10° to the horizontal in the collapsed position of the linkage to about 55° in the extended position. Arm 73 for example is 31 inches long between centers 77 and 81f and the pivot thereto of link 97 is located at a point 19 3/16 inches from 77 measured along the center line and 1 1/16 inches to the side of that center line measured perpendicularly thereto. The link 97 is 21⅛ inches long between centers. The distance between centers 77 and 79 and 87 and 89 is 18 inches.

I shall next describe the setter frame F and the manner in which it receives its pins from the chutes C and releases them to the alley and will refer more particularly to Figs. 8–11. The frame as a whole comprises what it is convenient to term a main frame comprising the two side bars 105 and 107, which are supported at the two sides of the alley by the linkages just described comprising the arms 83 and 85 connected to the bars at the pivots 87 and 89. These bars carry at their forward ends the arms 55 which support the roller 57 for returning the alley floor section to its depressed position, as already described. Intermediate cross connections between these side bars are not herein shown, as in the present construction the auxiliary frames which are about to be described and the connection thereof to the side bars provide adequate positioning for the latter. The side bars as shown conveniently present two spaced walls providing end bearings for the pivots 87 and 89. Toward the front and toward the rear of the side bars are short levers 109 pivoted centrally of their length to the side bars in the construction shown on centers 87 and 89. The upper and lower ends of the levers are pivoted respectively to channels 111 and 113 extending longitudinally of and forming a part of two auxiliary frames, an upper frame 115 and a lower frame 117 having generally the form of shallow sheet metal trays to the interior bottoms of which the channels referred to are secured. The two auxiliary frames are thus capable of relative movement longitudinally when the levers 109 are rocked, this movement being substantially rectilinear.

The bottoms of the trays of these auxiliary frames have holes therethrough in triangular array corresponding to that of a setup of the pins on the alley and herein the lower auxiliary frame 117 carries at the forward margin of each of its holes a substantially semi-cylindrical member 121 the concavity of which faces rearwardly and the upper auxiliary frame 115 carries at the rearward side of each of its holes a substantially semi-cylindrical member 123 with its concavity facing forwardly. The member 121 extends out through the hole in the upper frame and the member 123 downwardly through the hole in the lower frame and when the two auxiliary frames are in the position of relative approximation the two cooperate to form a split cylinder to receive a pin. The walls of the members 121 and 123 may have indentations 125 forming shoulders which underride the pin below the point of its greatest diameter and, in the position of the parts shown in Fig. 9 and Fig. 5, will retain the pin suspended, as shown in the latter figure. If, however, the upper auxiliary frame moves rearwardly and the lower frame forwardly from the position shown in Fig. 9, the two semicylindrical members 121 and 123 of each set are spread apart as shown in Fig. 6, and if moved upwardly will retreat, leaving the pins behind.

Figures 9, 10:
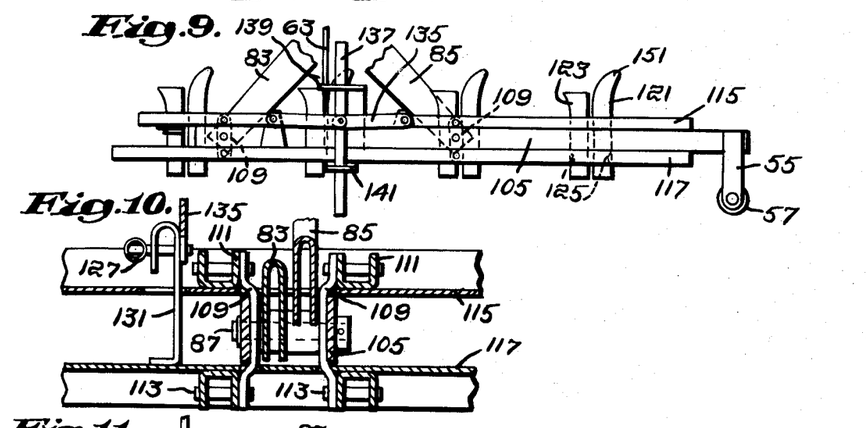
Figs. 10 and 11 are sections on the correspondingly numbered lines of Fig. 9, but on a larger scale.
Figure 11:
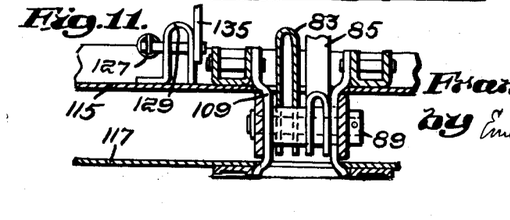

Springs 127 (one at each side of the frame) connecting brackets 129 and 131 on frames 115 and 117 respectively, normally tend to move the auxiliary frames to the position shown in Fig. 6, but they are held in the more closely approximated position by means of toggles 135 the ends of which are connected to the frames respectively, and which may rest in a self-sustaining position, slightly below dead center, with their center points supported by the stop provided by the bottom of the upper frame as shown in Fig. 9. A vertical rod 137, sliding in upper and lower guides 139 and 141 is connected to the center point of each toggle and if moved upwardly from the position shown in Fig. 9 to the position shown in Fig. 6 it will break the toggle to the position shown in the latter figure, the guide 139 providing a stop therefor more remote from the dead center position than the stop at the lower side thereof. This releases the two frames to the action of the spring 127 which moves them to the position shown in Fig. 6 to release the pins.

The frame F descends with the toggles 135 in the position shown in Fig. 5 and substantially simultaneously with its arrival at its lowermost position the lower ends of rods 137 contact the alley floor as seen in Fig. 6, spreading apart the auxiliary frames and releasing the pins. The vertical motion required is slight and requires little force. It entails no jar. The frame then moves upwardly empty, and as it reaches its uppermost position the rods strike abutments 143 which return the toggles to the position seen in Fig. 9, so that the pin receiving elements 121 and 123 are in their approximated position to receive and retain another set of pins delivered thereto from the chutes C. The toggles 135, being thrown slightly over dead center, keep the parts in that position during the downward movement of the frame F. In Fig. 4 this frame is shown a short distance down in the descending phase of its movement.

The rearwardly facing members 121 have upwardly extending lips 151 which extend beyond the tops of the cooperating members 123 and in the raised position of the parts oppose the ends of the respective chutes C (see Fig. 1) at some distance therefrom. The pins descending the chutes have their movement somewhat checked by movable buffers 133 (Fig. 4) and the ends come to rest against these upwardly extending portions 151 as shown by the No. 1 pin shown dotted in Fig. 3. When the frame starts to descend as shown in Fig. 4, these lips exert sufficient drag on the ends of the pins to cause them to tip into a more vertical position as shown in Fig. 4 and as the movement continues they drop into the pin holding portions of the frame, being received there as shown in Fig. 5, and are released as already described when the frame comes to the end of its movement as illustrated in Fig. 6.

Figure 12:
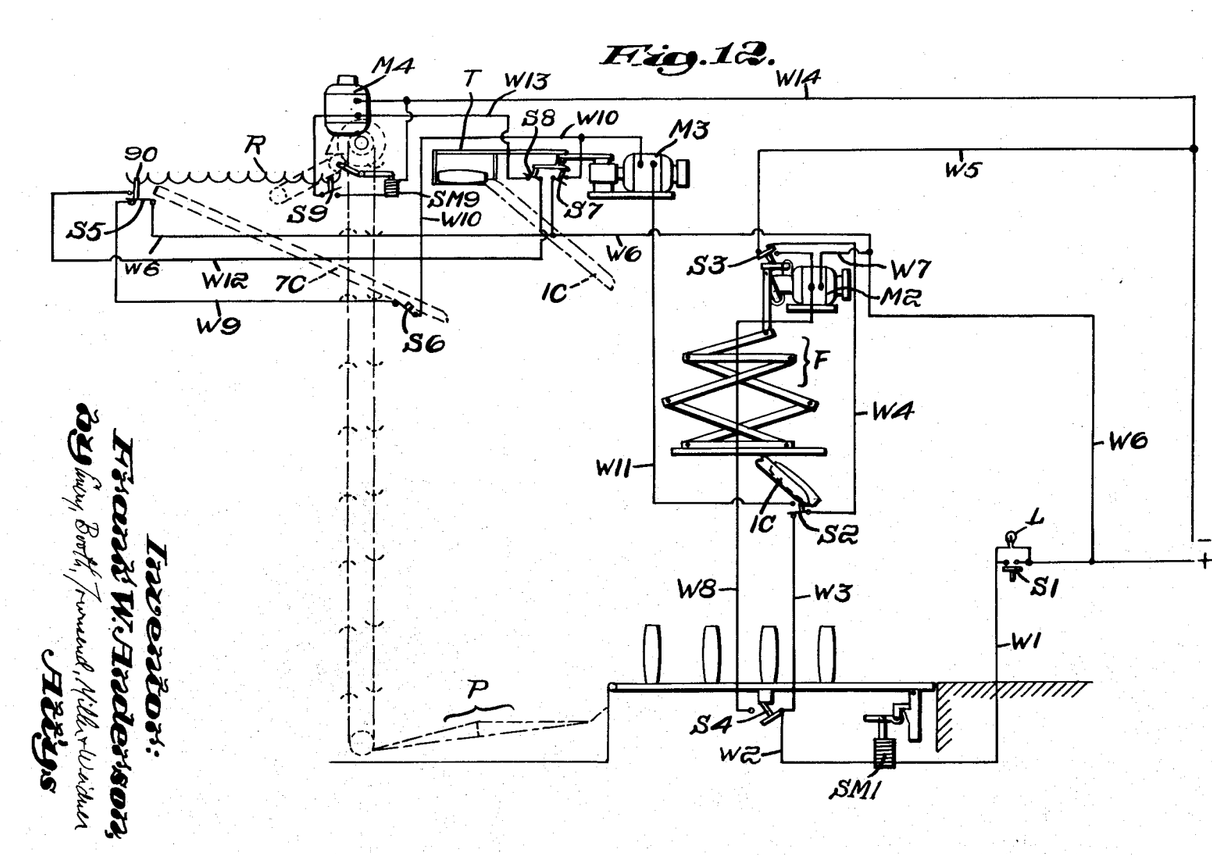
Fig. 12 is a wiring diagram.

The coordinated action of the mechanism with its elements functioning in properly timed relation will be clear from the description of the electrical system involved which will now be described in connection with the diagram, Fig. 12.

Since, as already explained, the structure more particularly described in this case forms a part of a coordinated machine involving other parts having the functions of those disclosed in my companion case already referred to, the constructions more particularly described in my companion case are shown diagrammatically in the wiring diagram and will be referred to in describing the electric system. A fuller description of these parts and the particular method of operation will be found in the companion case.

Let us assume that we are working with a set of twenty-five pins. In point of time let us assume that a frame has been completed, that five pins are on the alley, that ten are in chutes C ready to move into the setter frame F when it descends to place them on the alley in order to permit a new frame to be bowled, and that ten pins are in the assembly rack R. This implies that the operating plunger 90 of two-way switch S5 has been depressed and engages the lower contact as shown at the left of the diagram. The player will now depress push-button switch S1 at the head of the alley. The momentary depression of this switch now effects the clearance of the alley through the following circuits.

*Circuit No. 1, alley clearance.*—From the positive side of the line through closed push-button switch S1, wire w1 to solenoid motor SM1, which is energized, wires w2 and w3, through switch S2 closed in the position shown by the No. 1 pin, wire w4, through two-way switch S3 in the position illustrated to which it has been raised by the retreat of the setter frame F to raised position, wire w5 and to the negative line. The energization of the solenoid motor causes the movable section 15 of the alley floor to tilt upwardly and discharge any standing pins or deadwood to the pit P. The interlocking feature involved in this circuit is as follows. Assuming that it had been operated to work the alley clearing mechanism described, permitting the setter frame F to start in operation as will be explained, someone might idly work the push-button S1 again, but the solenoid motor SM1 would not be energized because its circuit would be open at the switch S3 if the frame had moved from up position, or at the switch S2 if the frame had returned to up position but the chutes C had not yet been replenished with pins. When this No. 1 circuit is closed at S2 and S3 but open at switch-button S1 the signal lamp L bridged around the push-button is lighted and indicates that the push-button may be operated. The resistance of the lamp is such that not enough current passes to operate the solenoid motor SM1. Therefore the lighting of the lamp shows that switch S2 is closed and pins are in the chutes ready to enter the setter frame F, and that switch S3 is closed and the setter frame is in up position.

Consequent on the initiation of the movement of the alley clearing mechanism, that is, in the example shown, on the tilting of the rear section of the alley 15, the switch S4 closes and in the present example as soon as this happens the setter frame F may start its cycle of motion, this being controlled by the following circuit.

*Circuit No. 2, setter frame operation.*—From the positive line through wires w6 and w7 to the motor M2, wire w8, switch S4 now closed, wire w3, through switch S2 in the chute 1C for the No. 1 pin, through switch S3 in the raised position shown and wire w5 to the negative side of the line. When the motor M2 starts into operation and the setter frame begins to descend, this circuit is broken at switch S3, but its movement to the lower contact illustrated provides a circuit direct from the motor through wire w5 to the negative line, short-circuiting those parts of the circuit above traced out, between the motor and the switch S3. When the setter frame F returns to its upper position this latter circuit is opened at switch S3. Circuit No. 1 above traced out was opened at switch S4 by the return of the alley floor section 15 to horizontal position incidental to the setting operation. Motor M2 stops with the frame F in its up position.

The interlocking features of circuit No. 2 are as follows. The motor cannot start until the alley has been cleared and switch S4 closed. It cannot start unless pins are in the chutes ready to be carried by the setter frame F to the alley. This is ensured by switch S2 in the chute 1C for No. 1 pin. This is the longest and least steep of the chutes. Ten pins are delivered to the chutes at once and if No. 1 pin reaches the end of its chute it is safe to conclude that all will be in place.

When the setter frame F has descended to the alley floor to transfer its load thereto and returned to elevated position, moving the switch S3 to the position illustrated in the diagram, the motor M3 is actuated to operate the transfer mechanism T and move from the assembly rack R the ten pins which are thereon and cause them to move through their respective chutes C to the setter. This motor M3 is controlled by the following circuit.

*Circuit No. 3, transfer operation.*—From the positive line through wire w6 to the switch S5 at the end of the assembly rack R. Since we have assumed that this rack was full the plunger 90 of two-way switch S5 has moved its arm to the lower contact shown and the circuit continues through wire w9, through switch S6 at the lower end of No. 7 chute, which is closed because there is no pin in the chute, the pin having moved into the setter frame when it began to descend, through wire w10 to the motor M3, through wire w11 to switch S2 at the end of the chute 1C for the No. 1 pin, which is closed on the upper contact shown because there is no pin in the chute, through wire w4 to switch S3 above the setter, which is in the upper position because the setter has returned to raised position, and through wire w5 to the negative line. This energizes the motor M3. As the motor driven mechanism moves to the right viewing Fig. 12, switch S7 is closed, connecting wires w6 and w10, and short-circuiting switches S5 and S6. Switch S8 is opened for a purpose which will appear. The motor makes one revolution and causes the transfer mechanism T to pull the pins out of the assembly rack R into their respective chutes C through which they descend and from which they will be transferred to the setter frame when the latter commences its downward descent. When the assembly rack is emptied in this manner switch S5 returns to the up position not illustrated in the drawings, breaking circuit No. 3 and the switch S7 is opened by the return of the motor driven mechanism to its initial position so that the motor is de-energized after one revolution.

The interlocking features of circuit No. 3 are as follows. The motor cannot be energized until ten pins are in the assembly rack and switch S5 has closed this circuit. The chutes must be empty and switches S2 and S6 closed. Switch S6 is in the chute 7C for the No. 7 pin. This is the shortest and steepest chute and the switch therein is sure to be opened if pins have been delivered to the chutes. Finally if the setter frame has started to descend and has emptied the chutes pins cannot be precipitated through the chutes to scatter on the alley because the circuit will have been opened at switch S3.

When the pins have left the assembly rack switch S5 moves to its upper contact. When motor M3 returns its driven parts to their initial position, switch S8 is closed and elevator motor M4 starts into operation through the following circuit.

*Circuit No. 4, elevator motor.*—From the positive line through wire w6, switch S5 in its up position viewing the diagram, wire w12 through switch S8 which has been closed by the return by motor M3 of the discharging element of mechanism T to its rearward position (toward the left viewing the diagram) wire w13 to the motor M4 and through wire w14 to the negative side of the line. The motor M4 starts into operation at once and begins to carry pins upwardly from the pit. The five pins which were discharged to the pit at the beginning of the complete cycle are elevated and put into the assembly tray. If no further pins are knocked into the pit the motor will continue to run idly, but as fast as any pins are knocked into the pit they will be moved upwardly and the pins in the rack will be advanced from the receiving end thereof until ten are assembled and the first to be delivered to the rack after motor M4 started in motion arrives at the No. 7 position at the further end of the rack and opens this circuit at the switch S5.

The switch S9 is closed on the delivery of a pin from the elevator to the adjacent end of the assembly rack to energize solenoid SM9 to engage a one-revolution clutch for moving the pin forwarding mechanism through one cycle as fully described in my companion application.

The following are among the outstanding features of the mechanism described. The automatic lifting of the alley floor section 15 and of the barrier 47 therefor. The return of the alley floor by the action of setter frame F. The contemporaneous lifting of the floor section and descent of the frame. The reciprocation of the frame by expansible and collapsible linkages. The control of the pin holders of the setter frame with a wide separating movement horizontally effected gently, and as a result of a very slight and slow vertical movement substantially at the limit of downward movement of the setter frame when it is almost at rest.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to inicate those principles of the invention exemplified by the particular embodiment described and which I desire to secure by Letters Patent.

I claim:

1. A pin-setting machine comprising an overhead support above the rear end of the alley, a setter frame having pin holders, the frame being suspended from said support by an expansible and collapsible linkage at either side thereof which is pivotally connected to said frame and support at two horizontally spaced points at either side thereof, power means on the support having driving connections for each linkage to one of the adjacent links thereof for expanding the linkages to move the setter down to the alley through successive parallel positions and for collapsing the same to retract it to raised position adjacent the support, means for supplying pins to the pin holders in the raised position of the setter frame and means for releasing them to the alley in the down position of the frame.

2. In a pin setting machine as defined in claim 1 wherein said linkages comprise a first pair of arms pivoted at their upper ends to the support and crossed, a second pair of arms pivoted at their lower ends to the setter frame and crossed, the lower ends of the first pair being pivoted to the upper ends of the second pair and means for enforcing equal and opposite angular movements of the links of the respective pairs.

3. In a pin setting machine as defined in claim 1 wherein said linkages comprise a first pair of arms pivoted at their upper ends to the support and crossed, a second pair of arms pivoted at their lower ends to the setter frame and crossed, the lower ends of the first pair being pivoted to the upper ends of the second pair and means for enforcing equal and opposite angular movements of the links of the respective pairs, said means comprising gears between the upper pivots of the first pair of arms.

4. In a pin setting machine as defined in claim 1 wherein said linkages comprise a first pair of arms pivoted at their upper ends to the support and crossed, a second pair of arms pivoted at their lower ends to the setter frame and crossed, the lower ends of the first pair being pivoted to the upper ends of the second pair and means for enforcing equal and opposite angular movements of the links of the respective pairs said means comprising equalizing links between the arms of the two pairs respectively.

5. In a pin setting machine as defined in claim 1 wherein said linkages comprise a first pair of arms pivoted at their upper ends to the support and crossed, a second pair of arms pivoted at their lower ends to the setter frame and crossed, the lower ends of the first pair being pivoted to the upper ends of the second pair and means for enforcing equal and opposite angular movements of the links of the respective pairs said means comprising equalizing links each extending between an arm of the first pair and the arm of the second pair which is inclined in the same general direction and pivoted thereto at points displaced, in opposite directions on the two arms, from the line of centers between the pivots of the arms.

References Cited in the file of this patent

UNITED STATES PATENTS

| Number | Name | Date |
|---|---|---|
| 1,181,649 | Downey | May 2, 1916 |
| 1,426,201 | Lanier | Aug. 15, 1922 |
| 1,924,477 | Wulf | Aug. 29, 1933 |
| 2,221,697 | Ball | Nov. 12, 1940 |
| 2,229,852 | Kaufman | Jan. 28, 1941 |
| 2,231,473 | Kaufman | Feb. 11, 1941 |
| 2,282,608 | Rempel | May 12, 1942 |
| 2,310,218 | Davis | Feb. 9, 1943 |
| 2,380,601 | Luth et al. | July 31, 1945 |
| 2,450,249 | Murphy | Sept. 28, 1948 |
| 2,469,886 | Murphy | May 10, 1949 |
| 2,498,587 | Snyder | Feb. 21, 1950 |
| 2,508,934 | Berg | May 23, 1950 |
| 2,518,457 | Fretter | Aug. 15, 1950 |